United States Patent
Roy

(10) Patent No.: US 8,406,722 B2
(45) Date of Patent: Mar. 26, 2013

(54) CHANNEL RECEPTION CHARACTERISTICS THROUGH CLOCK RATE ADJUSTMENT

(75) Inventor: Iain Roy, Mississauga (CA)

(73) Assignee: Psion Inc., Missisauga, Ontario (CA)

( * ) Notice: Subject to any disclaimer, the term of this patent is extended or adjusted under 35 U.S.C. 154(b) by 100 days.

(21) Appl. No.: 13/036,280

(22) Filed: Feb. 28, 2011

(65) Prior Publication Data

US 2012/0218017 A1    Aug. 30, 2012

(51) Int. Cl.
*H04B 1/10* (2006.01)

(52) U.S. Cl. .... 455/296; 455/76; 455/67.11; 455/67.13; 455/63.1; 375/346; 375/326

(58) Field of Classification Search .......... 455/296, 455/76, 67.11, 67.13, 63.1; 375/346, 326
See application file for complete search history.

(56) References Cited

U.S. PATENT DOCUMENTS

| | | | |
|---|---|---|---|
| 6,564,040 B1 * | 5/2003 | Fujiwara | 455/76 |
| 2003/0198307 A1 * | 10/2003 | Neill et al. | 375/346 |
| 2007/0242780 A1 * | 10/2007 | May et al. | 375/340 |

* cited by examiner

*Primary Examiner* — Sanh Phu

(57) ABSTRACT

A method, apparatus and system are described for adjusting the frequency of one or more clock signals used by a device. The one or more clock signals are adjusted by a determined amount when a channel quality metric of an RF channel in use by the device indicates a degradation in the reception quality.

28 Claims, 8 Drawing Sheets

CHANNEL RECEPTION CHARACTERISTICS THROUGH CLOCK RATE ADJUSTMENT

TECHNICAL FIELD

The present invention relates to improving radio frequency (RF) channel reception characteristics at a receiver and in particular to improving RF channel reception characteristics at a receiver by adjusting a rate of a clock signal.

BACKGROUND

A varying electrical signal produces electromagnetic radiation (EMR), which may interfere with radio frequency (RF) signals. Electronic devices often contain one or more RF components comprising receivers, transmitters or transceivers for wireless communication as well as one or more components that require a periodic clock signal, referred to as clocked components, to operate. The one or more clock signals may be generated by a voltage controlled oscillator (VCO) or a phase lock loop (PLL) and a crystal oscillator. The crystal oscillator provides a base clock signal of a fundamental frequency, which may be multiplied and/or divided to generate the required frequency of the clock signal. The frequency of the clock signal provided by a VCO may be adjusted by the voltage applied to the VCO.

The clock signal or signals required by one or more clocked components of the electronic device may cause undesirable radio frequency interference (RFI) with the RF components of the electronic device depending on the frequency of the clock signal(s) and a channel frequency of the RF component being used. In order to reduce the clock generated RFI, the RF component may be provided with shielding to reduce the effects of the RFI. However, the RFI may still interfere with the desired signal at unshielded points of the RF component, such as at an antenna.

Previous attempts at reducing clock-generated RFI included spreading the frequency spectrum of the clock signal by introducing clock jitter, which varies the clock frequency slightly above and below the desired clock frequency. However, introducing clock jitter may be unsuitable for clocked components that require a precise clock signal, such as a display component.

A further attempt, described in U.S. Published Patent Application US 2009/0138745 A1, published May 28, 2009, included determining the RF frequencies used by the RF components of the electronic device and creating a list of safe fundamental clock signal frequencies. The clock signal frequencies of the device could then be adjusted based on the list of safe frequencies to avoid collisions between harmonics of the adjusted clock signal frequencies and the RF frequencies of the RF components. While this could reduce the collisions, the deterministic nature of the safe list of fundamental clock frequencies did not adjust to varying factors that could affect the clock generated RFI. Furthermore, the previous attempts required that the PLL (phase locked loop) or VCO (voltage controlled oscillator) actually produce the clock signal at the desired frequency selected from the safe list of frequencies. However, such a requirement may be difficult to meet, due to variations in the manufacture of the clock source and/or the environment of the clock source and/or the aging of the clock source.

SUMMARY

It is desirable to provide an electronic device with a means for improving channel characteristics at a receiver that overcomes or otherwise mitigates at least one of the disadvantages of prior attempted solutions.

There is disclosed a method for improving reception channel quality comprising monitoring a radio frequency channel quality metric (RF metric) of a radio frequency channel in use by a device, determining as a target clock signal a clock signal used by a clocked component of the device to adjust when the RF metric violates a threshold, determining a clock adjustment to apply to the target clock signal, adjusting a rate of the target clock signal according to the clock adjustment, and returning to monitor the RF metric of the radio frequency channel or an RF metric of another radio frequency channel in use by the device.

There is further disclosed an apparatus for improving reception channel quality comprising a channel monitor component for monitoring a radio frequency channel quality metric (RF metric) of an RF channel used by an RF receiver of a device, and a clock control component for determining as a target clock signal a clock signal used by a clocked component of the device to adjust when the RF metric is above or below a threshold and for determining a clock adjustment to apply to the target clock signal, the clock control component further for returning to monitor the RF metric of the radio frequency channel or an RF metric of another radio frequency channel in use by the device.

There is still further disclosed a system comprising an electronic device for improving reception channel quality comprising a channel monitor component for monitoring a radio frequency channel quality metric (RF metric) of a radio frequency channel used by an RF receiver, and a clock control component for determining as a target clock signal a clock signal used by a clocked component to adjust when the RF metric is above or below a threshold and for determining a clock adjustment to apply to the target clock signal, the clock control component further for returning to monitor the RF metric of the radio frequency channel or an RF metric of another radio frequency channel in use by the device. The system further comprises a peripheral device comprising the clocked component operating at a frequency of the clock signal, the RF receiver, a clock source generating the clock signal, a RF metric component for determining the RF metric associated with the RF receiver and communicating the RF metric to the channel monitor of the electronic device, and a local clock generator for controlling the clock source to generate the clock signal according to the clock adjustment of the target clock determined by the clock control component of the electronic device.

BRIEF DESCRIPTION OF THE DRAWINGS

Embodiments are described herein, by way of example only, with reference to the attached Figures in which.

DETAILED DESCRIPTION

Figure 1:
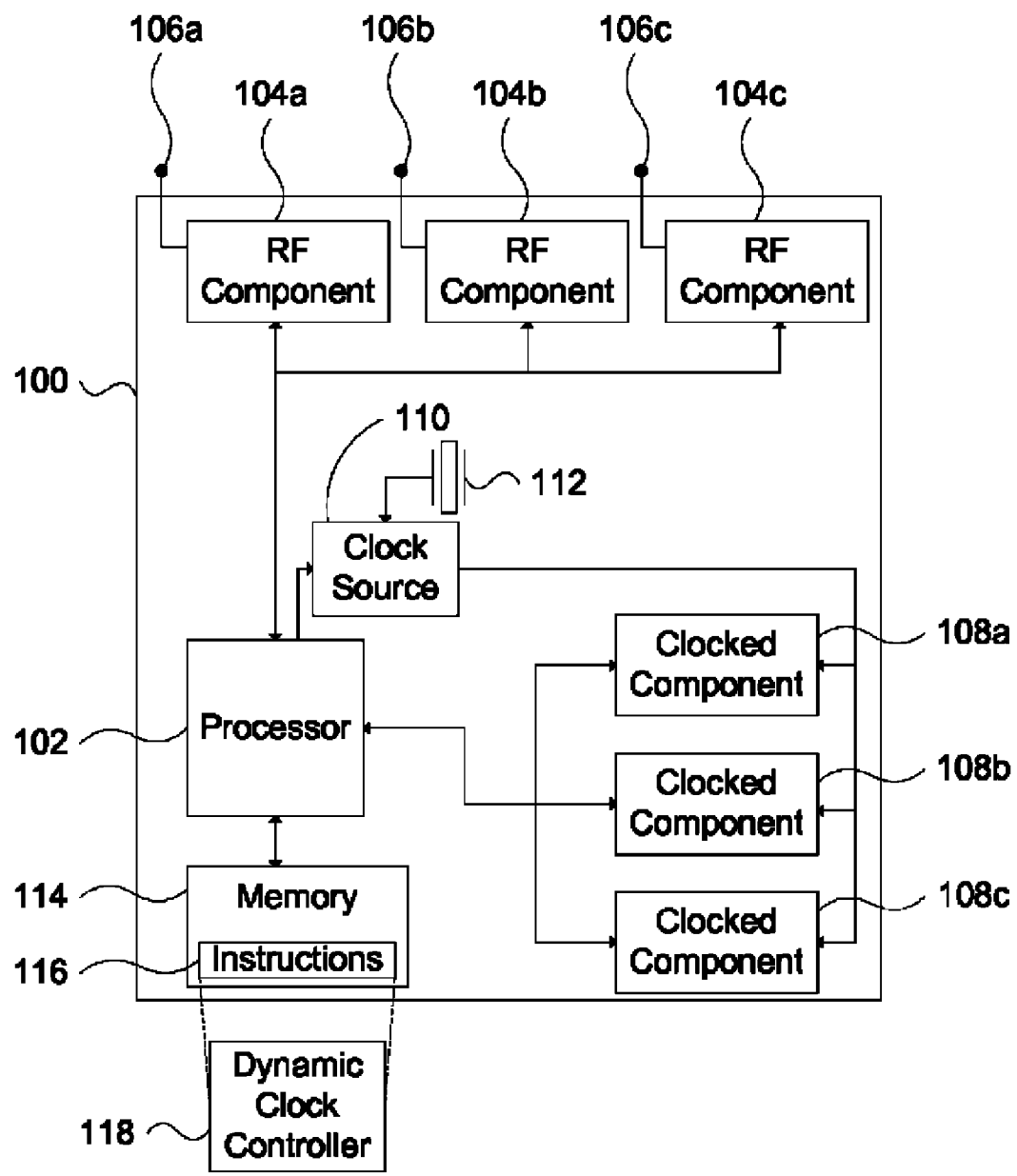
FIG. 1 is a block diagram of an electronic device in accordance with the present invention.

It will be appreciated that for simplicity and clarity of illustration, where considered appropriate, reference numerals may be repeated among the Figures to indicate corresponding or analogous elements.

Many electronic devices have radio frequency (RF) components for wirelessly communicating with other devices or networks. These electronic devices also comprise digital clocked components that require a periodic signal also referred to as a "clock signal" for operating. Unfortunately, the clock signal inevitably generates an RF signal at a frequency dependent upon the rate of the clock signal. The clock generated RF signal may have a frequency or harmonic that can interfere with the frequency or frequencies of the RF signals used for wireless communication.

In order to reduce radio frequency interference (RFI), whether it be clock-generated RFI or externally generated RFI, electronic devices may include RF shielding around the RF components. However, the RF shielding adds another component to the electronic device resulting in additional expense and increased assembly complexity and may result in a larger electronic device. Clock-generated RFI may be reduced by adjusting the rate of the clock signal so that the frequency, or harmonics of the frequency, of the clock-generated RF-signal does not overlap, or overlaps less, with the frequency of the RF signal used for the wireless communication.

In general, an RF signal used for wireless communication may be referred to as a "channel". The channel will have a center frequency, or frequencies, within a given frequency band. The quality of the channel, that is the ability to reliably transfer information via the channel, may be affected by various factors, including for example, multipath fading of the received RF signal, RFI generated from the environment and/or RFI generated within the electronic device. Generally, the quality of the channel may be represented by a signal-to-noise ratio (SNR). The higher the SNR, the higher the channel quality.

Information is transmitted using the channel by encoding the information and modulating the RF signal according to the encoded information. The encoding of the information may include additional information that allows a receiver to determine if the information was received correctly. If errors are detected the information may be resent, or if enough information was received to correct the detected error it may be corrected. The bit-error-rate (BER) of a channel represents the number of bits received in error versus the total number of bits transmitted.

Electronic devices may have numerous RF components that communicate using a number of different RF frequencies. Electronic devices may also have a number of clocked components that require different clock signal rates to operate. Typically the RF frequencies used for wireless communication cannot be shifted unilaterally by the electronic device, since both a transmitter, for example a cellular tower, and a receiver, for example the electronic device, must use pre-agreed frequencies. However it may be possible for the electronic device to change the rate of the clock signal(s) used by one or more of the clocked components of the electronic device.

Changing a rate of a clock signal used by a clocked component of the electronic device may reduce the resulting RFI with the RF channel used for communication by moving the frequency, or harmonics of the frequency, of the clock-generated RFI away from the frequency band of the RF channel. As described further herein, detecting if a channel metric, such as the BER, has violated a threshold and, if it has, then attempting to adjust the frequency of one or more clock signals may reduce the clock generated RFI and improve the reception characteristics of one or more of the RF components of the electronic device.

FIG. 1 is a block diagram of an electronic device in accordance with the present invention. The electronic device 100 is generally considered to be a portable electronic device 100 in which all of the components are contained within, or connected to, a housing (not shown). However, the electronic device 100 may be any electronic device having wireless communication abilities and at least one clocked component that requires a clock signal. Furthermore, as described with reference to FIG. 8, the clock adjustment may be applied to a distributed system comprising different devices communicating with each other.

The electronic device 100 comprises a digital component which is a processor 102 that is connected, either directly or indirectly through another element or controller (not shown), to the different components of the electronic device 100. The components include one or more RF components 104a, 104b, 104c, (referred to collectively as 104). The RF components 104 may be an RF receiver, transmitter or transceiver, each of which may include, or share, one or more corresponding antenna 106a, 106b, 106c. Each RF component 104 may operate at a different frequency or within a particular frequency band or bands depending on the communication protocol of the RF component 104. For example, a Wi-Fi transceiver according to the IEEE 802.11a standard communicates on one or more channels within the 5 GHz frequency band, and in particular, in North America, between 5.15 GHz-5.35 GHz and 5.625 GHz-5.725 GHz. A transceiver according to the IEEE 802.11b, g or n standards communicate on one or more channels within the 2.4 GHz range, and in particular between 2.4-2.4835 GHz. In North America, a cellular transceiver may communicate in the 700 MHz, 850 MHz, 1700 MHz, 1900 MHz and 2100 MHz frequency bands. As will be apparent, these frequencies and protocols are only mentioned herein as examples of the protocols and channels that RF components 104 may employ. The present invention can be used, instead or in combination, with a variety of other protocols and/or frequencies or frequency bands. The above examples have described the RF components 104 as RF transceivers providing two-way communication. However, the RF components may also comprise an RF receiver. For example, it could include a global position system (GPS) receiver for receiving RF signals in the 1575 MHz range.

The particular center frequency and bandwidth of an RF channel used by an RF component 104 may change during operation. For example, in a cellular environment, the specific frequency used for the RF channel may change when the electronic device 100 moves from a location with cell coverage provided by a first cellular base station to a different location with cell coverage provided by a second cellular base station.

The electronic device 100 also includes at least one clocked component 108a, 108b, 108c (referred to collectively as 108) that requires a clock signal to operate. The clocked components 108 may include, for example, a display component that requires a clock signal for timing the driving of the pixels, a universal serial bus (USB) component, which requires a clock signal for controlling the transmission/reception of data. The processor 102 also requires a clock signal in order to operate, as does a memory 114 of the electronic device 100. Other clocked components such as external interfaces for connecting peripherals may also require a clock signal. The electronic device 100 may need to generate a plurality of clock signals at various frequencies.

The following description refers to adjusting the rate of only the clock signals for the clocked components 108. It is contemplated that the clock signals for other components of the electronic device 100, such as the processor 102 and the memory 114, may also be adjusted.

The different rates of the clock signals required by the clocked components 108 may be generated and distributed by one or more clock sources. The clock source 110 may generate the required clock signals using various means, such as a voltage controlled oscillator (VCO) or a phase locked loop (PLL). The clock source 110 is described as using a phase lock loop (PLL) that generates the required clock signal at the appropriate rate by multiplying and/or dividing a base frequency signal supplied by a crystal oscillator 112. The crystal oscillator 112 provides a base clock signal at a particular frequency based on physical vibrations of a crystal. The PLL of the clock source 110 may be controlled by one or more signals from the processor 102 which cause the PLL to divide and/or multiply the frequency of the base clock signal provided by the crystal oscillator 112 in order to produce the required clock signal rate.

A single clock source 110 is described; however, in order to produce clock signals of different rates at the same time, it may be necessary to include a plurality of clock sources. Each of the clock sources may generate a clock signal at a particular rate using various means, including the PLL as described or a VCO. Each clocked component 108 may be associated with a unique corresponding clock source, or one or more clocked components may be associated with the same clock source if the clock signal rate of the one or more clocked components is the same. In addition to the plurality of clock sources, the electronic device 100 may also comprise a plurality of crystal oscillators for providing base clock signals of different frequencies to the clock sources.

The base frequency used by the clock source 110, has been described as being provided by a crystal oscillator 112. However the base frequency used by the clock sources 110 may be provided by other means. For example, the base frequency may be provided by a base-frequency source, in addition to or in place of the crystal oscillator 112. The base frequency source may be a clock source that is designed to provide a signal at a particular rate. However, some variability occurs in the manufacture of clock sources 110 and base-frequency sources which results in the actual rate produced not necessarily corresponding exactly to the desired or expected rate. Further, the rate of most base-frequency sources will vary with aging and/or changes in operating conditions such as temperature.

As described above, the clock signal generated by the clock source 110 will inevitably also generate an RF signal having a frequency corresponding to the rate of the clock signal. Clock signals are typically generated with a square waveform, or alternatively with a trapezoidal waveform, oscillating at a particular rate. The frequency-domain spectrum of these clock signals contain many frequency harmonics, being integer multiples of the fundamental clock rate. The frequency-domain spectrum may contain energy at RF frequencies that extend to hundreds of times the fundamental frequency. Each of these clock-generated RF harmonic signals may represent RFI that interferes with an RF channel used by one or more of the RF components 104. Although the actual frequency spectrum of the clock-generated RFI signal may differ from that of the source clock signal, due to, for example, transmission characteristics of RF signals within the electronic device, or other characteristics, the rate of the clock signal, and its integer multiples, may be used as the assumed frequency, and harmonic frequencies, of the associated clock-generated RF signal. In order to reduce the clock generated RFI with an RF channel, it is possible to adjust the rate of the clock signal so that the frequency, or harmonics of the frequency, of the clock generated RF signal do not interfere with the frequency, or frequency band, of the RF channel. For example, a USB device may require a 12 MHz clock signal. The 69th harmonic of the 12 MHz clock signal is 728 MHz. As such, the 12 MHz may interfere with an RF channel centered at, or near, 728 MHz. By adjusting the rate of the USB clock signal, for example, by 0.052 MHz down to 11.948 MHz, the interference with the RF channel may be eliminated or reduced as the 69th harmonic would now be 724.41 MHz which is relatively far away from 728 MHz. Since the USB interface will suffer little in terms of performance from adjusting the 12 MHz clock signal frequency to 11.948 MHz, it may be desirable to do so.

Although it is theoretically possible to pre-determine all possible RF channel interference frequencies and determine a clock signal assignment to reduce the clock-generated RFI, in practice this is not practical. The possible frequencies that may be used by RF components of an electronic device may be large and severely limit the clock signal rates that would reduce clock generated RFI with all the possible RF channels. Further, the active RF components 104 in device 100 may change with usage, and thus under some scenarios it may be desired to reduce RFI in one frequency range while under other scenarios it may be desired to reduce RFI in another.

In practice an electronic device typically only use a subset of all possible RF channels at a particular time, and as such, it is possible to set the clock signal frequency based on the actual RF channels currently in use by the electronic device. Adjusting the clock signal frequency based on the RF channels actually in use by the electronic device 100 provided greater flexibility in setting the clock signal frequency for reducing clock-generated RFI when compared to predetermining and changing the clock signal frequency based on all possible RF channels that can be used by the electronic device. However, selecting the desired clock signal frequency based on the frequency of the RF channel(s) in use requires that the clock source of the electronic device actually generate the clock signal at the pre-determined rate, which in turn requires that the base-frequency used by the clock source 110 is actually the expected frequency. As described above, the exact rate produced by a clock source and/or a base-frequency source may vary from the expected rate. The variability in the base-frequency can make changing the clock rate to a pre-determined rate ineffective or counter productive.

Further, the operating environment of the electronic device 100 can vary the effects of RFI, including clock generated RFI in unpredictable ways. For example, if the electronic device 100 is a handheld device, then the location of a user's hand holding electronic device 100 (or the absence of that hand) can result in different amounts of clock generated RFI being directed to different areas within electronic device 100. Also complicating the RF environment of the electronic device 100 is the possible addition or removal of peripherals or accessories from the electronic device 100, which can introduce or remove other clock sources which create RFI, or can introduce additional RF transceivers 104 whose performance must also be considered in any RFI reduction strategy as well as alter the RF transmission characteristics internal to the electronic device 100. For example, the electronic device 100 may be a modular handheld computer, such as the Omnii™ produced by Psion, which allows multiple different components to be connected in order to provide the handheld computer with expanded capabilities. Thus, unpredictable interactions between the electronic device 100 and the environment can, in some cases, negate the need to reduce clock-generated RF signals and in other cases increase the need to reduce the clock-generated RF signals. In real world circumstances it is impossible to predetermine which RF components 104 could be affected, and to what extent, by clock signal induced RFI. As such, selecting a clock rate to use from a predetermined set of frequencies and based on which RF channels are in use by the electronic device 100 may be ineffective or counter-productive.

In the present invention, the clock signal frequency may be incrementally adjusted in order to provide a clock signal rate whose inherent RF signal does not interfere with the RF channel used by an RF component 104 of the electronic device 100. Additionally, the clock signal rate may be dynamically adjusted only when it is determined that an RF component 104 is actually experiencing poor reception channel quality. As such, it is possible to adjust the clock signal rates used by one or more clocked components 108 in order to reduce clock-induced RFI when one or more RF components 104 are experiencing reduced reception quality.

As depicted in FIG. 1, the electronic device 100 further includes a memory 114, for storing instructions 116 and data. The memory 114 may be volatile memory such as random access memory (RAM), dynamic random access memory (DRAM), static random access memory (SRAM), registers etc., or non-volatile memory such as read only memory (ROM), hard disc drives, optical discs etc. The instructions 116 include dynamic clock controller instructions 118 which, when executed by the processor 102, configure the device 100 to provide dynamic clock control.

Figure 2:
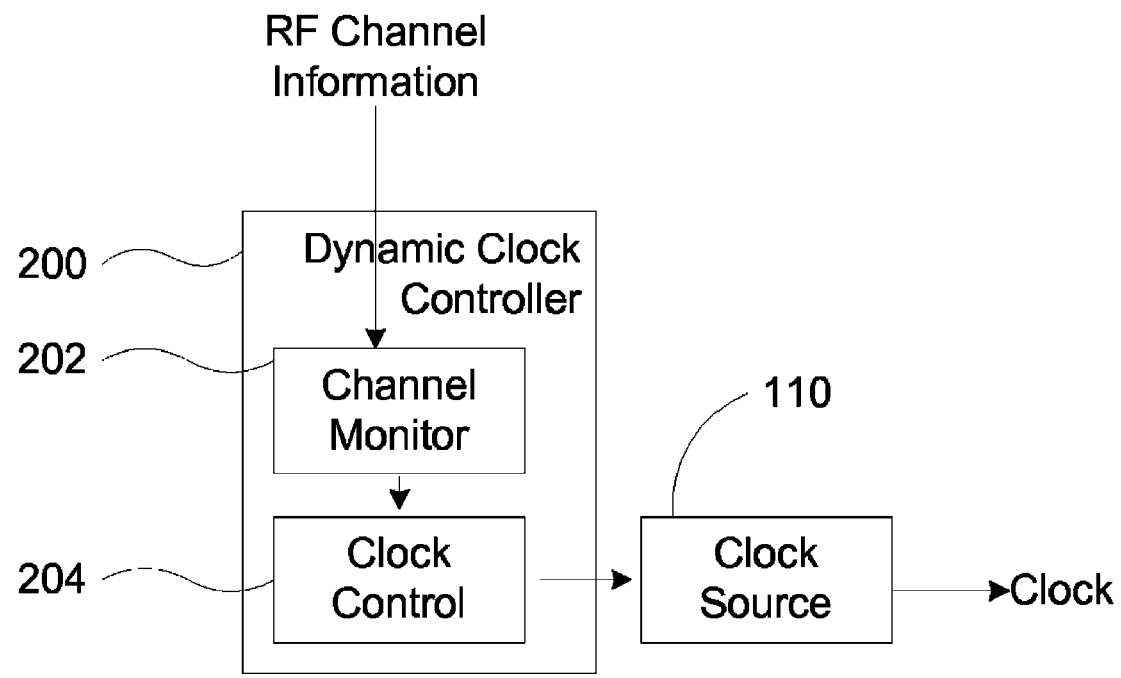
FIG. 2 is a block diagram of logical components of a dynamic clock controller in the electronic device of FIG. 1.

FIG. 2 depicts a block diagram of logical components of a dynamic clock controller 200 that may be implemented by the dynamic clock controller instructions 118. The dynamic clock controller 200 may comprises a channel monitor 202 and a clock control component 204. The logical components of the dynamic clock controller 200 are depicted as being separate components within the dynamic clock controller 200. However, although described as separate components, the necessary functionality may be provided by integrated or discrete combinations of components. Additionally, portions of the functionality may be provided by, or in conjunction with, other logical components of the electrical device 100. For example, the channel monitor 202 monitors a channel metric, which may be provided to the channel monitor 202 by the RF component 104 or by another component or device. Although numerous specific implementations are possible, the dynamic clock controller 200, and its functionality, is described herein with reference to individual components for clarity.

The dynamic clock controller 200 monitors RF channel information, or more particularly an appropriate RF channel metric associated with the RF channel, and based on that information determines one or more clock signals to adjust. An adjustment amount to adjust the rate of each of the one or more clock signals by is determined. The dynamic clock controller 200 then adjusts the clock signal rates according to the determined adjustment amount. After adjustment, the clock signals are subsequently generated be the clock sources, for example clock source 110, at the adjusted rates.

The channel monitor 202 determines when to attempt to adjust one or more clocks. The channel monitor 202 monitors an RF channel metric for each channel. The channel monitor 202 may receive an RF channel metric for the different RF channels of the RF components 104 in use by the electrical device 100. The RF channel metric can be any suitable metric indicating the performance of the channel and different metrics, or combinations of metrics, can be used with any particular RF component 104. For example, the RF channel metric may be a BER of the RF channel, SNR of the RF channel, a retransmission count for the RF channel etc. It is contemplated that an appropriate RF channel metric, for use by dynamic clock controller 200, will be pre-selected for each RF transceiver 104 when electronic device 100 is manufactured. However, it is also contemplated that the selection of an appropriate RF channel metric can be made subsequently in some cases, if desired, by changing the relevant instructions 118.

The dynamic clock controller 200 monitors the RF channel metric and determines if the RF channel metric has violated a threshold associated with the RF component 104. The threshold is selected such that violating the threshold indicates that the reception quality of the RF channel has degraded from an acceptable level. If the RF channel metric violates the threshold, then it is possible that the RF channel used by the RF component is being adversely affected by RFI, which may include some amount of clock-generated RFI. As such, the dynamic clock controller 200 attempts to adjust one or more clock signal rates in order to reduce the amount of clock generated RFI affecting that RF component 104 and increase the reception quality of the corresponding RF channel.

Once the channel monitor 202 determines that an RF channel metric associated with an RF component 104 has violated a threshold associated with the RF component 104, the clock control component 204 determines one or more of the clock signals that may be adjusted, which are referred to as target clock signals. The clock control component 204 determines an adjustment for each target clock signal. The adjustment determined for each of the target clock signals is an incremental adjustment away from a nominal rate, or current rate if it has already been adjusted, for the particular target clock signal. The adjustment amount may increase or decrease the rate of the clock signal from the current rate, which may or may not be the nominal rate of the clock signal. The extent of the adjustments that can be made to the rate of the clock signal may be predefined. For example, the clock signal rate may determine the operating speed of a clocked component 108, and that clocked component 108 may not operate correctly at a clock signal rate above a given frequency. Similarly adjusting the rate of the clock signal too low may also result in unsuitable operation, unstable operation, or failure of the clocked component 108 or the processor 102. Once the adjustment is determined for each of the target clock signals, the clock source 110 generates the adjusted clock signals.

The clock control component 204 may keep track of the adjustments made to each of the target clock signals in order to attempt to improve the reception characteristics of the RF channel. If the RF channel metric of the RF components 104 improves, for example above an improvement threshold associated with an RF channel, which may be different from the channel metric threshold used to determine if an adjustment should be attempted, prior adjustments made to the target clock signals can be undone, resetting the clock signal rates to their nominal values. Similarly, if the adjustments do not improve the RF channel metric, the adjustments made to the target clock signals can be undone and different adjustments applied.

The clock control component 204 may operate in various modes. For example, in a first mode, the clock control 204 may determine only a single target clock signal that is the most likely to be causing interference with the RF channel and this information can be predetermined, for example at time of manufacture of device 100, or may be determined by clock control component 204 from previous adjustments it has made and their effects on the channel metric of the RF component 204. For example, clock control component 204 may have successfully adjusted the clock to a USB transceiver component 108 to improve the channel metric for an HSDPA RF component 104 in ten out of the last fifteen adjustment operations. In such a case, when the channel metric threshold for the HSDPA RF component 104 is next violated, clock control component 204 will first try to adjust the clock to the USB transceiver component 108.

Alternatively, clock control component 204 may determine a single target clock signal to adjust at a time, regardless if it is determined to be the most likely to interfere or not. For example, clock control component 204 can always first adjust the clock signal for a USB transceiver component 108. If such adjustments do not result in an improvement in the particular RF metric, the adjustments may be undone and another clock signal selected as the target clock signal for adjustment.

In another mode, the clock control component 204 may select a plurality of target clock signals, each of which may cause RFI with the RF transceiver 104 and make adjustments to each of those target clock signals. In yet another mode, the clock control component 204 may randomly select one or more target clock signals to adjust.

In addition to determining the target clock signal(s) in various ways, the clock control component 204 may also determine the amount of adjustment for each target clock signal in various modes. For example, in a first clock adjustment mode, the clock control component 204 may adjust each clock signal down by a predetermined amount, in a second clock adjustment mode, the clock may be adjusted up by a predetermined amount. In a third clock adjustment mode, the clock may be iteratively adjusted up and down around a clock rate by an increasing amount. In a fourth clock adjustment mode, the clock signal control may select the adjustment amount randomly from within a range of operating frequencies. The range from which the clock signal frequency may be selected may be, for example, a range of clock signal frequencies that provide adequate operation of the clocked component 108.

While the description above describes methods for selecting a particular target clock, or clocks, and for selecting a particular adjustment amount, or amounts, the present invention is not limited to any particular selection method. It is contemplated that a variety of other methods for selecting target clock signals can be employed, for example using a predetermined ordered list of available target clocks, etc. and that a variety of other methods for selecting particular adjustment amounts can be employed, for example selecting the amount of the adjustment based on the amount by which the channel metric threshold was violated. Accordingly, the present invention is not limited to any particular method or system for selecting target clock signals or adjustment amounts.

Figure 3:
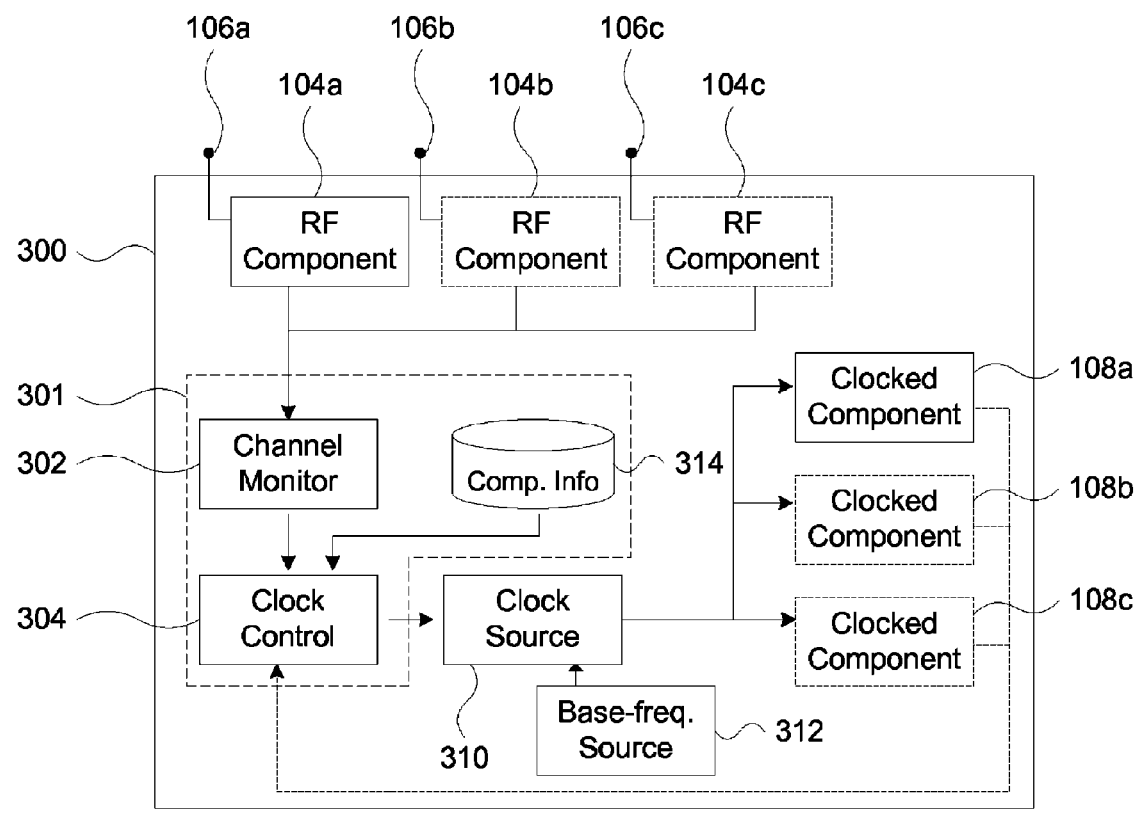
FIG. 3 is a block diagram of an electronic device in accordance with a further embodiment of the present invention.

FIG. 3 is a block diagram of an electronic device 300 in accordance with a further embodiment of the present invention. The components of the electronic device 300 are similar to those of electronic device 100 as described with reference to FIG. 1 and include RF components 104*a*, 104*b*, 104*c* with corresponding antennas 106*a*, 106*b*, 106*c* and one or more clocked components 108*a*, 108*b*, 108*c*. The electronic device 300 also comprises a processor (not shown) for executing instructions and a memory (not shown) for storing the instructions. The instructions, when executed by the processor configure the electronic device to provide a dynamic clock controller 301 as depicted. The dynamic clock controller 301 is similar in functionality to the dynamic clock controller 200 described above. However the dynamic clock controller 300 may further utilize information on the various clocked components 108, which may be stored in a storage means 314 which may comprise flat files, a database, or database structure such as a registry or other any suitable means for storing the information and this information may be determined at time of manufacture or in any other appropriate manner as will occur to those of ordinary skill in the art. Alternatively, the information on the clocked components may be retrieved from the clocked components themselves if an appropriate interface for retrieving the information is provided. The information may include, for example, an nominal clock rate and maximum and minimum operational clock rates.

The electronic device 300 also comprises at least one clock source 310 for generating a clock signal from a base frequency signal provided by a base frequency source 312. The clock source 310, may be a clock source 110 as described above, and the base frequency signal source 312 may be a crystal oscillator 112 as described above with reference to FIG. 1.

Although FIG. 3 depicts a plurality of RF components 104 and clocked components 108, the electronic device 300 may have more or fewer RF components 104 and clocked components 108.

For clarity of the description, the following assumes that each of the RF components 104 can provide to the channel monitor 302 a BER value indicative of the current reception quality of the RF channel, although other RF channel metrics could be used. Additionally or alternatively, the channel monitor 302 may receive information from the RF components 104 and determine an RF channel quality metric from the information. The channel monitor 302 receives a BER from the RF component 104*a*. The channel monitor 302 may periodically request the RF channel metric from the RF component 104*a*. Alternatively, the RF component 104*a* may be configured to provide the BER to the channel monitor 302 periodically. The channel monitor 302 monitors the received BER and determines if the BER has violated a threshold associated with the RF component 104*a*. The particular threshold used may be pre-selected for each RF component. Alternatively, the threshold may be adjusted dynamically based on the BER. For example, if the BER improves, the threshold may be adjusted according to the improved BER such that a subsequent decrease in the BER will initiate the adjustment of clock signal frequencies.

Regardless of the threshold and channel metric used, the channel monitor 302 monitors the quality of the RF channel, and attempts to adjust clock signal rates when the reception quality of the RF channel is degraded, as indicated by a violation of the respective threshold. The channel monitor 302 may be pre-configured with a threshold associated with the RF component 104*a*, or the channel monitor 302 may retrieve a stored threshold.

If the channel metric has not violated the threshold, no clock signal adjustments need to be made and the channel monitor 302 returns to monitoring the RF channel metrics of the RF component 104*a*.

If the channel monitor 302 determines that the RF channel metric has violated the threshold, the channel monitor 302 indicates to the clock control component 304 to attempt to adjust one or more clock signals in order to improve the channel metric. The channel monitor 302 may provide information regarding the frequency or frequency band, or bands, of the RF channel that is experiencing degraded reception quality to the clock control 304, for use in determining the target clock signals as well as the adjustments to make.

When the clock control component 304 receives an indication that the RF component 104a is experiencing decreased channel reception quality, the indication does not need to specify the particular RF component 104a, but may instead specify the frequency or frequency band or bands of the RF channel or channels that are experiencing the degraded reception quality. The clock control component 304 determines one or more target clock signals that may be adjusted to reduce the clock generated RFI, and so possibly improve the BER of the RF channel.

The clock control component 304 may select the target clock signal, or signals, to adjust in various ways. For example, the clock control component 304 may select a single target clock signal that is determined the most likely to affect the BER of the RF channel. Alternatively, the clock control component 304 may rank all of the clock signals from most likely to affect the BER to least likely to affect the BER and then select a number of the most likely clocks signals, for example the two most likely, to interfere and these selected two will be the target clock signals.

The clock control component 304 may determine the likelihood that a particular clock signal is causing interference at a particular frequency based on various information about the clocked components 108 associated with the clock signal. The information about clocked component 108 may be stored in the storage means 314, and/or it may be provided from the clocked components 108. The clocked component information used to determine the likely hood of interference may include a variety of information including the current clock signal rate, a value indicating the probability that this clock signal will affect an RF component 108 (as determined empirically or in any other suitable method) and the power of the clock signal. The clock control component 304 uses the current rate of the target clock to determine the relevant harmonic frequency of the clock-generated RF signal that is the closest to the channel frequency of the RF component 104 suffering poor reception quality. The target clock signals may be ranked based on which target clock signal's closest harmonic has the most overlap with the RF channel's frequency band. Additionally, if the different target clock signals have different power levels, the power associated with the respective target clock signals may be used as a weighting factor, so that a target clock signal whose associated harmonic frequency overlaps slightly more, but has relatively low power, is ranked as being less likely to affect the BER of the RF channel than a clock signal whose harmonic frequency overlaps slightly less, but has relatively high power.

As will be apparent, a variety of additional information may be used when ranking the clock signal rates. For example, since the power of an RF signal decreases in proportion to the square of the distance, the relative locations of components 108 an RF components 104, amongst others, within the electronic device 300 may affect the ranking. The relative location of components, for example the distance between a path for distributing a clock signal to the associated clocked component 108 and an antenna 106 of an RF component 104, may be accounted for using a location weighting value. If a location weighting value is used, a location weighting between each RF component 104 and each clocked component 108 may be stored in the clocked component information storage means 314 at time of manufacture. An alternative to the location weighting may include providing a measured attenuation weighting. The attenuation weighting is similar to the location weighting; however it reflects an actual RF signal power affecting the RF transceiver. The attenuation of each clock signal at each RF component 104 may be measured in a lab environment for each electronic device type or model by measuring the power of the clock signal and the corresponding power of the clock generated RF signal received at the RF component 104.

The ranking of the clock signals may be based on one or more of the above noted pieces of information. For example, the likelihood each clock signal interferes with an RF channel, or the clock signal's rank, may be determined for each clock signal currently used by the clocked components 108 according to the following equation:

$$Rank = Weightattenuation * Weightpower * (Overlap(RF\_Channel, nthHarmonic))$$

Where:
Weightattenuation is a weighting factor based on a measured attenuation factor of RF signals generated at the clocked component operating at the clock frequency whose rank is being determined and received at the RF component being monitored;
Weightpower is a weighting factor based on the power of the clock signal;
Overlap (x,y) provides an amount of overlap between an RF signal x that has a particular frequency band and an RF signal y that has a particular frequency band;
RF_Channel represents the frequency band of the RF channel; and
nthHarmonic represents the frequency band of the closest harmonic of the device's current clock frequency.

Once a clock signal has been selected for adjustment, the clock control 304 determines an adjustment to be made to the selected target clock signal. The clock adjustment may be determined in various ways. For example, the clocked component information storage means 314 may also store information pertaining to the maximum and minimum clock signal frequencies of the various clocked components 108 that provide suitable or stable operation. The clock signal adjustment may be selected as an incremental value, which may be bounded to constrain the adjusted clock signal to within the lowest and highest operating clock signal frequencies of the clocked component. Another option for determining the adjustment is to set the adjustment so that the adjusted clock frequency will be either the highest or lowest permitted operating clock signal frequency of the clocked component. Yet another option for determining the clock adjustment is to determine the nthHarmonic that causes the device to be ranked lower than a particular threshold and adjust the clock signal frequency to generate the determined nthHarmonic. The nthHarmonic may be determined by repeatedly calculating Rank, as described above, with different values for the clock signal frequency until a satisfactory result is obtained.

If there are multiple target clock signals, the adjustments may be determined individually as described above. Alternatively, the adjustment to each of the target clock signals may be selected randomly from within the associated operating frequency range. This may be used if the incremental adjustments fail to reduce the BER. Since the interaction between all of the components in the electrical device 300 may be complex, it is possible that randomly, and iteratively, setting the clock signal frequency adjustments for a plurality of target clock signals may be the most efficient way of reducing the BER of one more RF components 104 without requiring undue computing resources within channel monitor 302.

Once the clock control 304 determines the target clock signals and their associated adjustments, the target clocks are adjusted accordingly. The clocks may be adjusted by providing the frequency adjustment(s) to the clock source 310. Alternatively, the clock control 304 may determine the adjusted clock frequency, or frequencies, and provide that adjusted frequency or frequencies to the clock source 310. Regardless of the specifics of how the clock signal adjustment is communicated, the clock source 310 generates the clock signal, or signals, at the adjusted clock signal frequency, or frequencies.

The clock control component 304 may keep track of the adjustments made to each clock signal. This may be used to determine the next adjustment, or possibly reset or undo the adjustments. For example, if the BER of RF component 104*a* violates the threshold, the clock control component 304 may first attempt to adjust the clock signal frequency associated with a first clocked component 108*a* by an incremental amount. The channel monitor 302 continues to monitor the BER and if it remains in violation of the threshold, the clock control component 304 may again adjust the clock signal frequency by an incremental amount. The clock control component 304 may track the number and types of adjustments made, which will allow the clock control component 304 to undue previous adjustments, change modes and, for example, select another target clock signal, such as the clock signal associated with clocked component 108*b* for adjustment. If all the clock signals have been attempted to be adjusted, the clock control component 304 can select a plurality of target clock signals to adjust randomly.

The dynamic clock controller 301 is described above with regards to a single RF component 104. The dynamic clock controller 301 can be applied to monitor multiple RF components and adjust clock signals accordingly. If multiple RF components can be monitored it may be necessary to provide a conflict resolution mechanism to use when determining if an adjustment is acceptable. For example an adjustment may increase the channel metric associated with one RF component while decreasing the channel metric associated with another RF component. The resolution mechanism used to determine if an adjustment is acceptable may be based on various information, including a ranking of importance of RF components, so that a less important RF component cannot be adjusted in such a manner that would adversely effect a more important RF component.

The above has described the operation of the dynamic clock controllers 200, 301 and how electronic devices 100, 300 may use the dynamic clock controllers 200, 301. Although the functionality of the dynamic clock controllers 200, 301 described above may be provided in various ways, methods are described below that may provide at least some of the functionality when implemented by the electronic device 100, 300.

Figure 4:
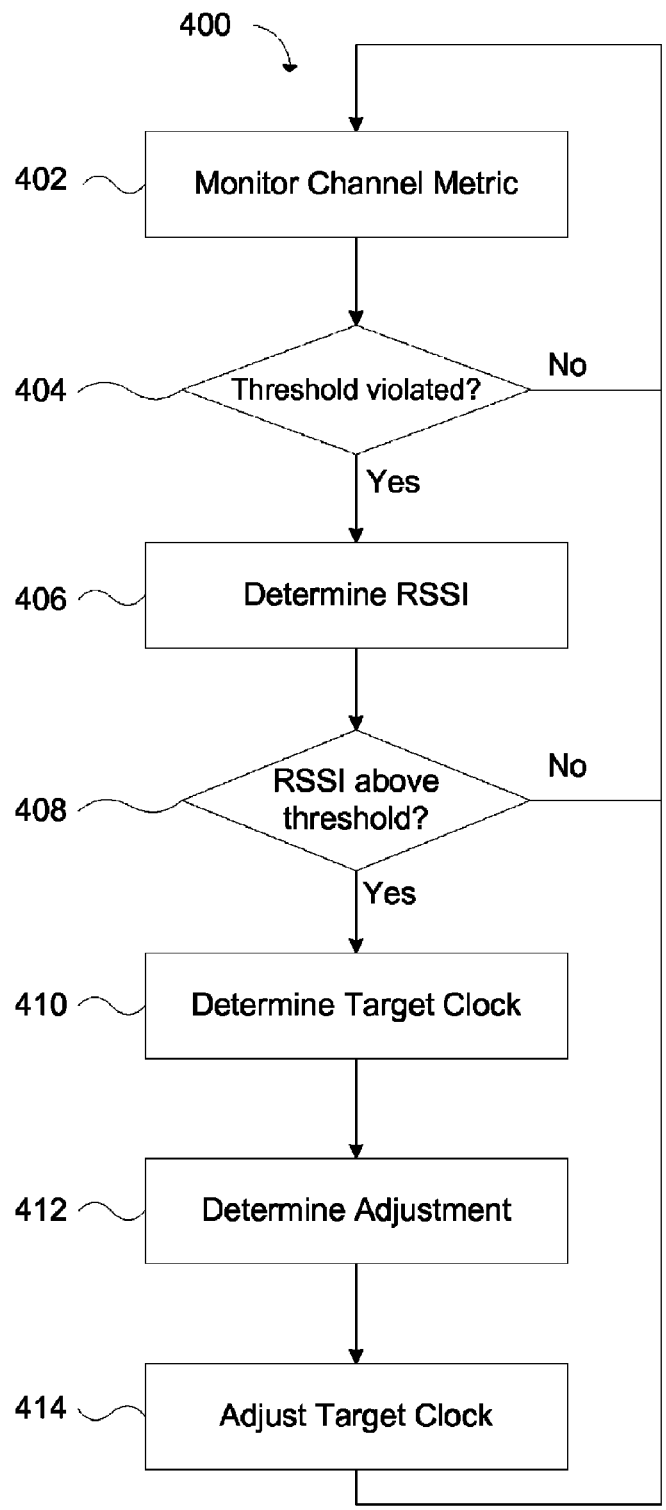
FIG. 4 is a flow chart of a method of improving channel reception characteristics in accordance with the present invention.

FIG. 4 depicts a flow chart of a method of improving channel reception characteristics through clock signal frequency adjustment. The method 400 is described with reference to electronic device 100 although it applies to electronic device 300 as well. The method 400 commences at step 402 with the monitoring of channel metrics for RF channels in use one or more RF components 104 of the electronic device 100. The channel metric may be determined based on channel information and may comprise, for example a BER associated with the RF channel, other reception quality information or a combination thereof. At step 404, the monitored channel metric is checked against a threshold to determine if the threshold has been violated. If the threshold has not been violated by the channel metric (No at 404), the method 400 returns to monitor the channel metric at step 402. If the threshold has been violated (Yes at 404), an RSSI value for the RF component associated with the channel metric violating the threshold is determined at step 406 and the determined RSSI value is checked against an threshold at step 408. The RSSI value provides an indication of the strength of the received signal. Typically an RF component 104 cannot successfully receive signals below a particular RSSI value. In certain applications, such as in mobile device, it may be desirable to operate the RF component 104 close to this minimum value threshold. By determining the RSSI value it is possible to determine if the channel quality will likely increase due to adjusting one or more clock signals. If the RSSI is determined to be at, or near, the minimum value threshold then the poor reception quality may be a result of the weak received signal strength, or signal noise inherent to the RF component and not clock generated RFI, and as such it may not be desirable to attempt adjusting the clock signal rate. If however the RSSI value is above the minimum value threshold, it may be worth attempting to minimize the clock generated RFI by adjusting a clock signal's rate. Although described as checking the RSSI value after determining if a channel metric has violated a threshold, the RSSI value may alternatively be checked prior to checking the channel metrics. Alternatively, the method 400 may completely omit determining and checking the RSSI value.

If the RSSI value is not above a threshold (No at step 408), indicating that adjusting clock signal rates may have little affect on the reception quality, the method may return to monitoring channel metrics at step 402. If the RSSI value is above a threshold (Yes at step 408), indicating that adjusting clock signal rates may affect the reception quality, a target clock signal for adjustment is determined at step 410. The clock signals of the electronic device 100 may be ranked in order of the likelihood of the clock signal causing RFI with the RF channel. For each clock signal, or those capable of being adjusted, of the electronic device 100, a rank value may be determined as described above. Once the rank is determined for the different clock signals, the most likely clock signal to cause the RFI may be selected. Alternatively a number of the most likely clock signals to cause the RFI may be selected. Alternatively still, a plurality of clock signals that are ranked above a particular level may be selected. Alternatively all of the clock signals may be selected. The selected clock signal, or clock signals, is, or are, the target clock signal, or signals.

Once the target clock signal(s) are determined, an adjustment for each one is determined at step 412. The adjustment for each of the target clock signal(s) may be determined individually or as a group if there is more than one target clock signal. When determining an adjustment for a single target clock signal, the adjustment may be based on an incremental adjustment above or below the current operating clock signal frequency. The incremental adjustment amount may be predetermined or it may be based on the determined channel quality metric, for example if the BER is high, the incremental adjustment amount may be relatively large. Alternatively, the clock adjustment may cause the target clock signal frequency to be adjusted to the maximum or minimum operating frequency for the clocked component the target clock signal is associated with.

Once the clock adjustment for the target clock signal(s) has been determined, the rate of the target clock signal(s) is adjusted according to the determined adjustment at step 414 and the method returns to monitoring channel metrics at step 402.

Figure 5:
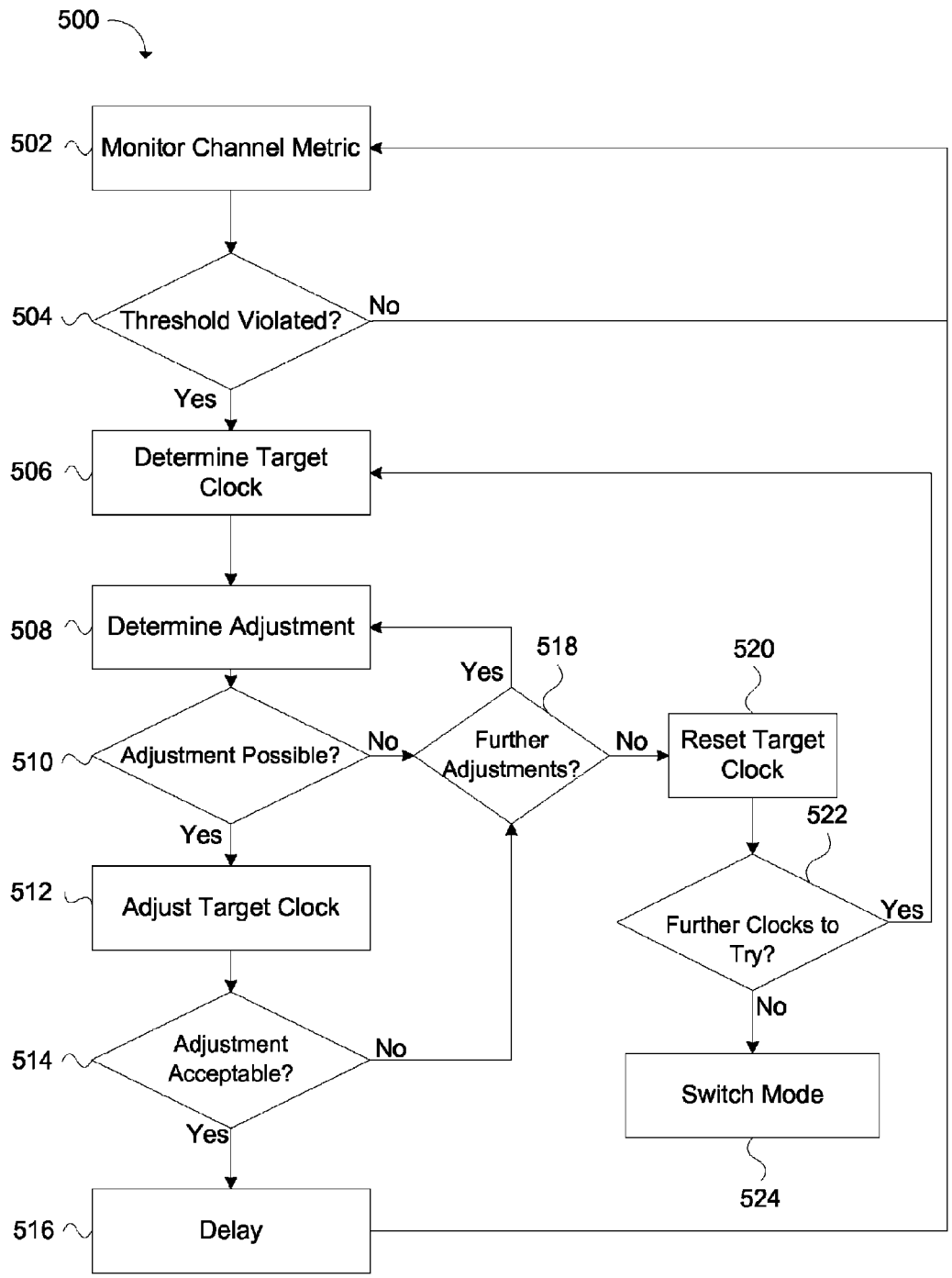
FIG. 5 is a flow chart of a further method of improving channel reception characteristics in accordance with the present invention.

FIG. 5 is a flow chart of a further method of improving channel reception characteristics through clock adjustment. The method 500 may be used to monitor RF components and adjust the rate of one clock signal at a time when trying to improve the reception quality of an RF channel. The method monitors a channel metric of an RF channel in use by an RF component (502). The method determines if the metric violates a threshold (504) and if it does not (No at 504) the method returns to monitor a channel metric (502). The next channel metric determined may be for a different RF channel or a different RF component. If the determined metric violates the threshold, indicating that the reception quality of the channel has degraded, (Yes at 504) a target clock signal for adjustment is determined (506). The target clock signal may be determined as described above. Once the target clock signal is determined an adjustment to the target clock signal is determined (508). The adjustment may be determined based on previous adjustments that did not sufficiently improve the channel metric. For example, if previous adjustments lowered the clock rate to minimum operating rate of the clocked components, the adjustment may increase the rate from a nominal clock rate. Similarly, the clock adjustment may increase the or decrease by multiples of a fixed amount, for example a first adjustment may adjust the clock rate by $+\Delta$, the next adjustment, assuming the previous adjustment did not improve the channel metric, could be $-\Delta$, and following adjustments could be $+/-2\Delta$, $+/-3\Delta$ from a nominal clock rate. The clock adjustment is checked to determine if it is possible to make (510). For example, if it is determined that the adjustment that is to be made to the target clock signal would cause the target clock signal to have a rate outside the range of possible operating rates of an associated clocked component, the adjustment is not possible. It may not be necessary to explicitly determine if the adjustment is possible, if for example, the clock adjustment is always determined within a possible range of operable clock rates. If the target clock signal adjustment is determined to be possible (Yes at 512), the target clock signal is adjusted accordingly (512). After the target clock signal is adjusted, it is determined if the adjustment is acceptable (514).

Determining if the adjustment is acceptable may involve for example determining if the RF channel metric of the RF component suffering degraded reception quality improves. Additionally, or alternatively, the determination of whether the adjustment is acceptable or not, may be based on an RF channel metric of one or more RF components other than the one being monitored. By monitoring the effect of clock adjustments on other RF components, it is possible to accept, or reject, the clock signal adjustment based on the effect the clock signal adjustment has on all of the RF components, and not just the RF component whose reception quality degradation caused the clock signals to be adjusted. Priorities of different RF components may be set to specify a relative importance of improving or degrading the different RF components. For example, a cellular radio may have a high priority such that any changes that degrade its reception quality are not acceptable, even if they result in an improved reception quality of one or more RF components. The priorities may be adjusted based on various factors, including whether the RF component is currently in use for transmission/reception of information as well as user preferences with regards to the RF component, power consumption of the electronic device, or other factors.

If the channel metric improves, the adjustment may be acceptable. If the adjustment is acceptable (Yes at 514) there may be a delay (516) before determining another channel metric for the next RF channel or RF component (502). If the adjustment is not acceptable (No at 514) then the adjustment to the target clock rate did not improve, or did not improve enough, the reception characteristics of the RF channel and it is determined if further adjustments can be made to the target clock (518).

If the adjustment is not possible (No at 510), then it is determined if further adjustments can be made to the target clock (518). As described above, the adjustment amount may be determined in various ways, for example by lowering the clock rate to a minimum operating rate, followed by increasing it to a maximum operating rate. Similarly the determination as to whether or not there are further adjustments possible may be done in various ways based on how the clock adjustment is determined.

If further adjustments are possible (Yes at 518) the next adjustment is determined (508). If however no further adjustments are possible (No at 518), the rate of the target clock is reset (520). Since the method 500 attempts to adjust a single clock signal at a time, the adjustments made to the target clock signal are reset (520) and it is determined if there are further clock signals to try adjusting (522). If there are further clock signals to attempt to adjust (Yes at 522), the next target clock signal is determined (506) and adjustments attempted as described above. If it is determined that there are no more clock signals to try (No at 522) the clock signal selection and adjustment mode may be switched (524). For example, it may be switched to a mode that attempts to adjust multiple clock signals.

The amount of time of the delay may vary from fractions of a second to seconds or even tens of seconds or higher. The amount of delay may be set based on various factors, including the amount of processing time that can be devoted to the dynamic clock adjustment, the operating environment of the device, and the RF channel quality metric. The more processing time that can be devoted to the dynamic clock adjustment, the smaller the delay may be set. If the operating environment of the device is one in which the RF characteristics are quickly changing it may be desirable to have a small delay to quickly adjust to the changes. The RF channel metric may determine a minimum delay. If the RF channel metric takes 1 ms to determine, it may not be useful to have a delay time less than 1 ms, since the RF channel metric will not have changed. For example, a BER may be based on how many bits are received in error out of every 100 bits received. If the RF component receives 1000 bits/second, the BER value will be updated approximately every 0.1 seconds. As such, the delay time between monitoring the BER of the same RF component should be greater than 0.1 seconds. The delay between checking the channel metric for a particular RF component or channel may be varied based on changes of the channel metric. For example, if the channel metric has been steady for a particular period of time and indicates a high quality channel, the delay between checking the channel metric may be set at a relatively long period of time. In contrast, if the channel metric indicates a low quality channel, or is degrading, the delay between checking the channel metric may be set at a relatively short period of time.

Figure 6:
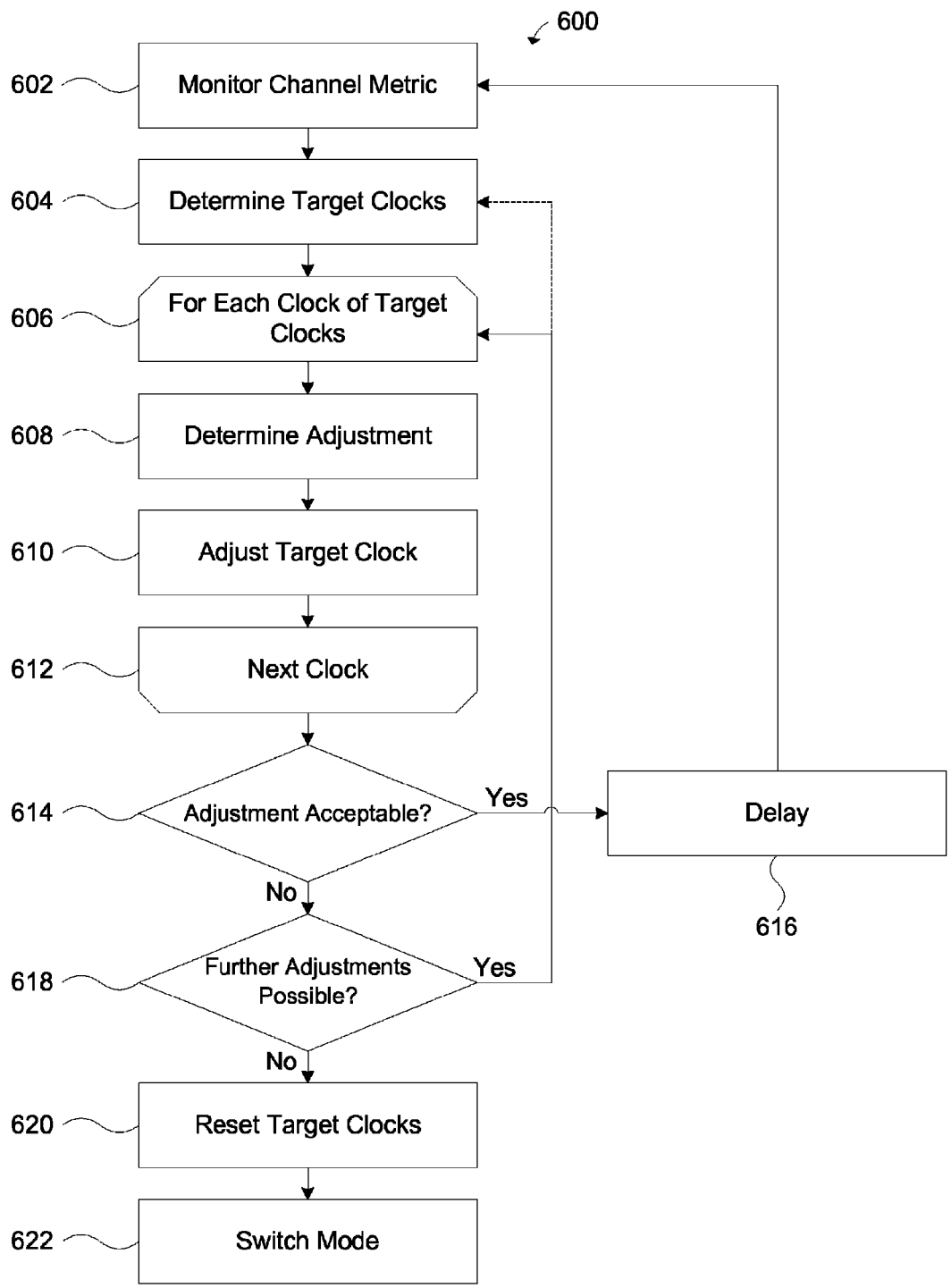
FIG. 6 is a flow chart of a further method of improving channel reception characteristics in accordance with the present invention.

FIG. 6 is a flow chart of a further method of improving channel reception characteristics through clock adjustment. The method 600 may be used to monitor RF components and adjust the rate of multiple clock signals at a time when trying to improve the reception quality of an RF channel. An RF channel metric is monitored (602) and a plurality of target clock signals are determined that may interfere with the RF channel. (604). For each clock signal of the target clock signals (606) an adjustment is determined (608) and the target clock signal adjusted accordingly (610). After the clock signal is adjusted, the next clock signal (612) adjustment is determined and applied. Once all of the target clock signals have been adjusted it is determined if the adjustments are acceptable (614). If the adjustments improve the reception quality of the RF channel the adjustments may be acceptable. Additionally or alternatively the acceptability of the adjustments may be based on the effects they have on other RF component. If the adjustment is acceptable (Yes at 614) there may be a delay (616) before monitoring another channel metric for a different RF transceiver (602). If the adjustment is not acceptable (No at 614) it is determined if there are further adjustments possible (618). There may be further adjustments if either the target clock signals may be further adjusted, or there are further clock signals that can be selected for adjustment. If there are more adjustments possible (Yes at 618) each of the target clock signals are adjusted further (606) or more target clock signals are determined (604) for adjustment. If there are no further adjustments possible (No at 618) the adjustments to the target clock signals are reset (620) and the clock selection and adjustment mode may be switched (622).

As described above, by iteratively adjusting the clock rates by incremental amounts as needed, rather than changing them to a pre-determined rate, variability between the expected rate and the actual rate of a clock source can be compensated for.

Although not described further here in, other modes are possible. For example, it may be desirable to select all of the possible clock signals and for each one select a random adjustment from within a range of possible operating clock frequencies.

The above methods have assumed that the RF metric threshold value is pre-determined, and clock signal frequencies are adjusted, or attempted to be adjusted, if the RF metric violates the threshold. It is possible to dynamically adjust the threshold so that the dynamic clock control continually attempts to improve the RF metric of an RF component, by incrementally adjusting clock signal rates to reduce clock generated RFI. The threshold may be updated as the RF channel metric of an RF component improves. Once the RF metric begins to drop, it will fall below the dynamic threshold, and the clock signal rates will be adjusted to attempt to maintain the RF channel quality. The dynamic threshold may similarly be lowered if the RF metric decreases. The dynamic threshold may be adjusted based on a weighted average of a plurality sequential RF channel quality metrics to prevent the dynamic threshold from changing too quickly. Using a dynamic threshold can allow the dynamic clock control to adjust to various different operating conditions. This may be beneficial as it can allow the dynamic clock control to be used in numerous different electronic devices without requiring tuning the dynamic clock control specifically to each electronic device.

The above description has assumed that only a single channel metric violates a threshold at a time. In practice it is possible that multiple channel metrics will violate a threshold at a particular time. In such a case, it is possible to select one of the multiple channel metrics that have violated the threshold, and treat it as the only channel metric that violated a threshold and proceed as described above. In selecting the channel metric from the plurality of channel metrics, a priority ranking may be used when determining which channel metric to select.

Figure 7:
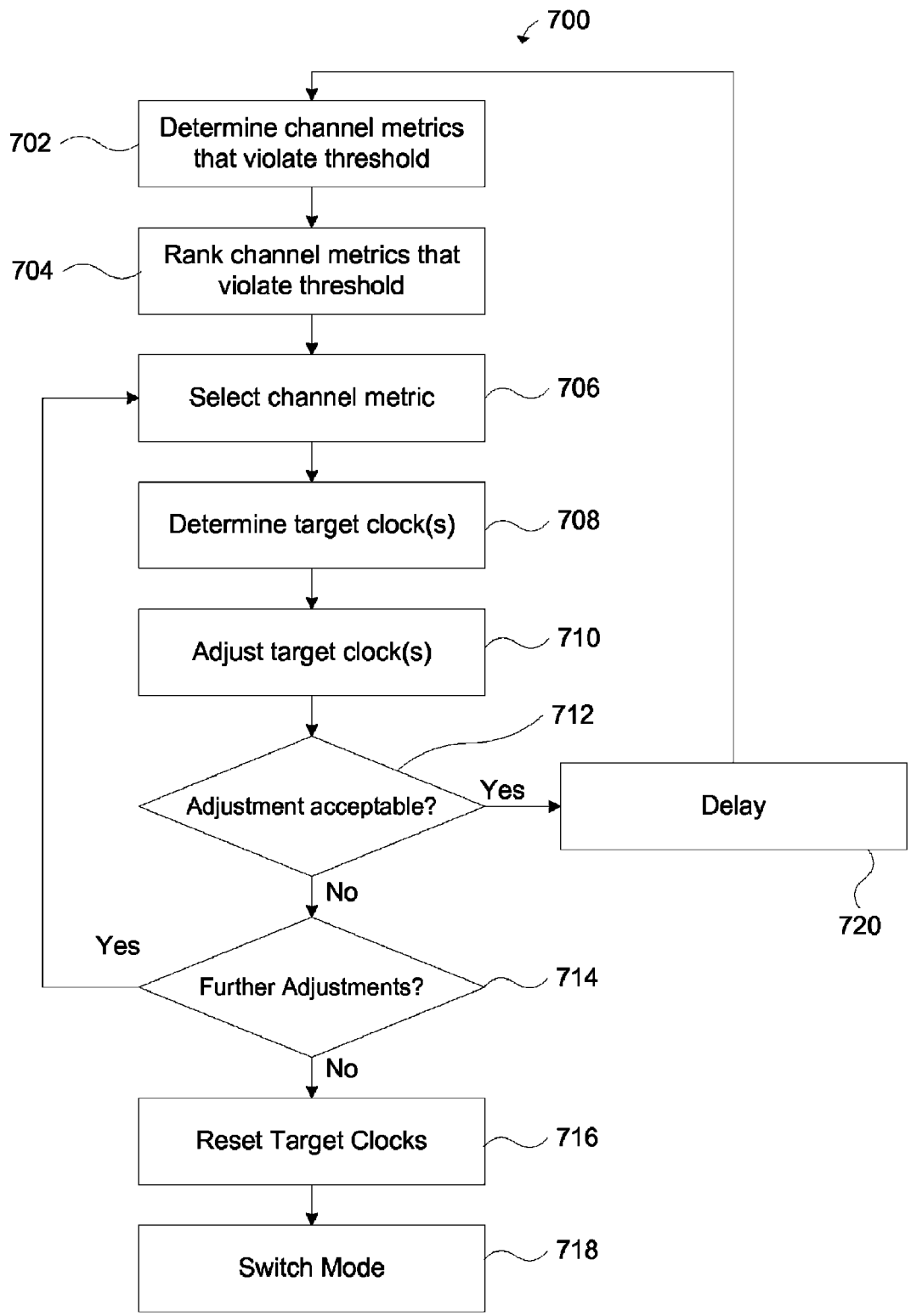
FIG. 7 is a flow chart of a further method of improving channel reception characteristics in accordance with the present invention.

FIG. 7 is a flow chart of a further method of improving channel reception characteristics through clock adjustment. The method 700 can be used to adjust clock rates when multiple channel metrics violate the associated thresholds at the same time. The method 700 determines all of the channel metrics that violate their associated thresholds (702). Once the violated channel metrics are determined, they may be ranked (704). The violated thresholds may be ranked based on a priority ranking, for example indicating a relative importance of the associated RF channel. For example, an RF channel for a cellular RF component may have a higher priority than an RF channel for a Bluetooth™ RF component, which in turn may have a higher priority than an RF channel than an RF component for transmitting data. Additionally or alternatively the ranking may be based on past results of clock adjustments. Although depicted in FIG. 7, it is not necessary to rank the violated channel metrics. Regardless of whether the violated channel metrics are ranked or not, a channel metric is selected (706) to base the adjustments on. Which channel metric to select may be based on various factors, including which other channel metrics have been violated, the ranking of the violated channel metrics, whether any of the violated channel metrics have been previously selected and/or the results of previous adjustments. For example, it may be desirable to repeatedly attempt to select the violated channel metric with the highest priority ranking until no further adjustments are possible based on the selected violated channel metric before selecting the next ranked violated channel metric. Alternatively, the next violated channel metric may be selected to base adjustments on so that all violated channel metrics are select to base the adjustments on prior to selecting a violated channel metric again to base adjustments on. Once a violated channel metric is selected, target clock(s) are determined for adjustment (708) and an adjustment for the target clock(s) is applied (710). The method determines if the adjustment is acceptable (712). An adjustment may be acceptable if it has improved the all of the violated channel metrics. Alternatively, the adjustment may be acceptable if it has improved the violated channel metric the adjustments are selected based upon. Alternatively still, the adjustments may be acceptable if they improve a selected one or more of the violated channel metrics, such as those ranked as being the most important or having the highest priority. Additionally, the determination as to whether the adjustment is acceptable may be based on whether the adjustments have negatively impacted any channel metrics.

Regardless of the specifics of how it is determined if the adjustments are acceptable, if they are (Yes at 712), a delay (720) may be performed prior to returning to determine the channel metrics that violate their associated thresholds (702). If the adjustments are not acceptable (No at 712), it is determined if further adjustments are possible (714), and if further adjustments are possible (Yes at 714) another violated channel metric is selected to base the adjustments on (706). As described above, the particular violated channel metric selected may be based on various factors, including which violated channel metric was previously selected, previous adjustments made, etc. If no further adjustments are possible (No at 714) the adjustments made to the target clock(s) may be reset (716) and an adjustment mode switched (718). For example, the mode may be switched in order to only consider a single channel metric at a time.

Figure 8:
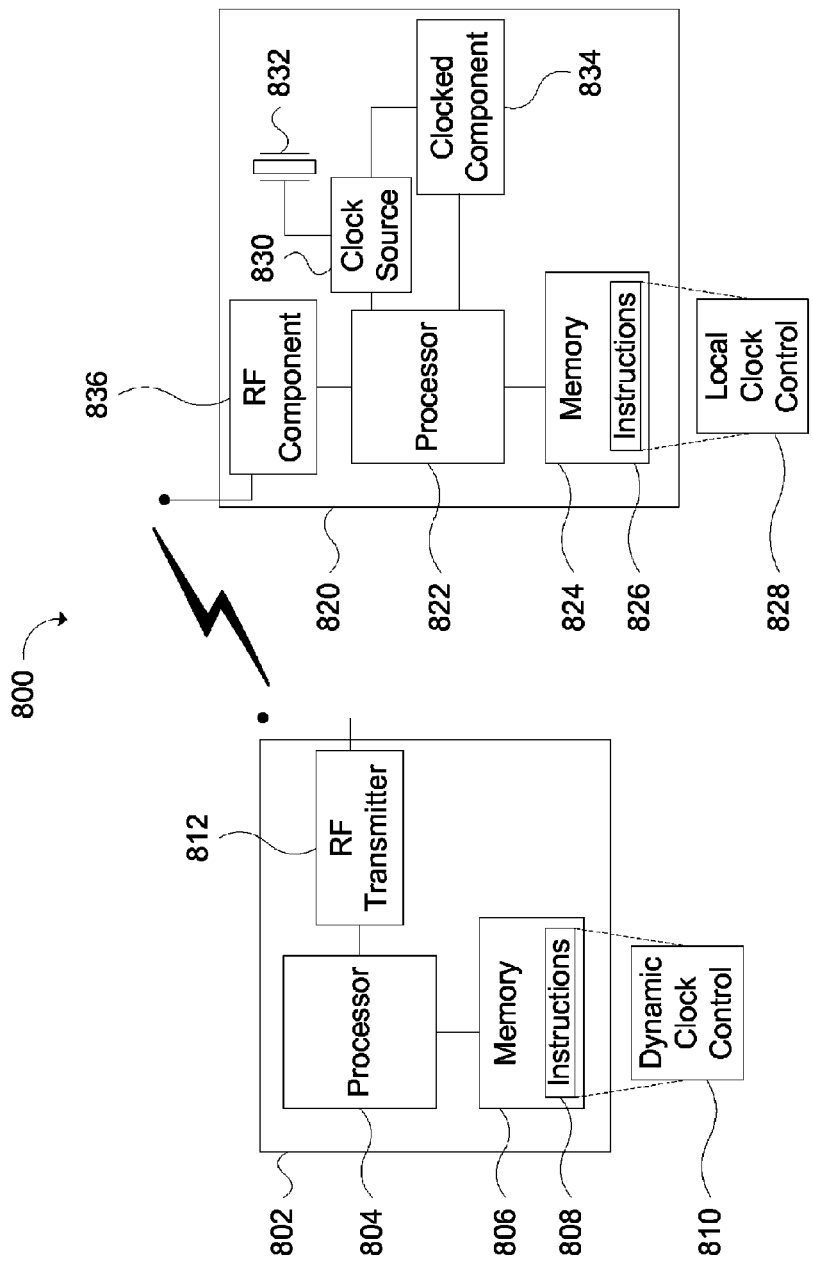
FIG. 8 depicts a distributed system for improving channel reception characteristics in accordance with the present invention.

FIG. 8 depicts a distributed system for improving channel reception characteristics through clock adjustment. The system 800 is similar to the electronic devices 100, 300 described above; however the clocked component 834 for which the clock signal is being adjusted is located in a physically separate device 820 from the electronic device 802 that determines the clock adjustment. The separate device 820 and the electronic device 802 can communicate with each other, either wirelessly or over a wired connection.

The system 800 comprises an electronic device 802 and a peripheral device 820. The electronic device 802 communicates with the peripheral device 820 and is capable of adjusting the rate of clock signals used by clocked components of the peripheral device. The adjustment is determined at the electronic device 802 and communicated to the peripheral device 820 via a wireless communication path. Although depicted as being wireless, the adjustment may also be communicated over a wired communication path.

The electronic device 802 comprises a processor 804 and a memory 806 storing instructions 808 for execution by the processor 804 and may comprise an RF component 812 for wirelessly communicating with the peripheral device 820. The instructions 808 include dynamic clock control instructions 810, which when executed by the processor 804 configure the electronic device 802 to provide dynamic clock control functionality. The dynamic clock control functionality is substantially similar to the dynamic clock control functionality of the dynamic clock control functionality described above with reference to dynamic clock controller 200 and/or 301. However, the dynamic clock control provided by dynamic clock control instructions 810 receives the RF channel metric associated with an RF component of the peripheral device 820. Alternatively, if the electronic device 802 is communicating with the peripheral device 820 using the RF channel that is being monitored, it is possible for the electronic device 802 to determine the RF channel metric for the RF component of the peripheral device 820. Although, the RF metric determined by the control apparatus 802 may not directly reflect the reception characteristics of the RF channel, it may provide a sufficient proxy to allow a determination as to whether the reception quality of the channel has degraded. For example, the reception quality may be determined based on a number of requested retransmissions.

Regardless of if the RF metric is determined by the peripheral device 820 and communicated to the electronic device 802 or if the electronic device 802 determines the RF metric, it is used to determine if clock signal rate adjustments should be made at the peripheral device 820. The electronic device 802 may include information about what clocked components are present in the peripheral device 820, as well as the clock signal rates and other relevant information about the components.

The electronic device 802 determines a target clock of the peripheral device 820 to adjust and an adjustment to make. The electronic device 802 communicates the adjustment to the peripheral device 820.

The peripheral device comprises a processor 822 and a memory 824 storing instructions 826 for execution by the processor 822 and an RF component 836. The RF component 836 is depicted as communicating with the electronic device 802, although it may communicate with other electronic devices. The peripheral device 820 includes a clock source 830 for generating a clock signal used by a component 834. The clock source 830 may comprise a VCO or a PLL that multiplies and/or divides a base frequency provided by a crystal oscillator 832.

The instructions 826 stored in memory 824 include instructions for local clock control 828. The local clock control 828 may determine an RF metric of the RF component or receiver and communicate it to the electronic device 802, although the electronic device may determine the RF channel metric. The local clock control 828 receives from the electronic device 802 an indication of a clock adjustment to make to a clock signal and controls the clock source 830 in order to adjust the clock signal as indicated.

The system 800 described above may comprise multiple physically separate components controlled by a single electronic device. Each of the separate components may still benefit from dynamic clock adjustment, assuming that the separate components comprise an RF component and an adjustable clock signal that may interfere with the RF channel, which is provided by the single control apparatus.

System, apparatus and methods of dynamic clock control for adjusting a clock frequency to improve attempt to improve reception quality of an RF channel have been described. The above-described embodiments of the invention are intended to be examples of the present invention and alterations and modifications may be effected thereto, by those of ordinary skill in the art, without departing from the scope of the invention which is defined solely by the claims appended hereto.

What is claimed is:

1. A method for improving reception channel quality comprising:
   monitoring a radio frequency channel quality metric (RF metric) of a radio frequency channel in use by a device;
   determining a frequency band of the RF channel;
   determining as a target clock signal a clock signal used by a clocked component of the device to adjust when the RF metric violates a threshold, wherein determining the target clock signal to adjust comprises:
      determining one or more possible clock signals, each of the possible clock signals having a rate that has a harmonic within a given range of the center frequency; and
      selecting, as the target clock signal, the clock signal having a greatest overlap between a frequency band of the clock signal and the frequency band of the RF channel;
   determining a clock adjustment to apply to the target clock signal;
   adjusting a rate of the target clock signal according to the clock adjustment; and
   returning to monitor the RF metric of the radio frequency channel or an RF metric of another radio frequency channel in use by the device.

2. The method of claim 1, further comprising:
   determining a plurality of target clock signals to adjust when the RF metric violates the threshold;
   determining a plurality of clock adjustments to apply to respective clock signals of the plurality of target clock signals; and
   adjusting the plurality of target clock signals according to the respective clock adjustment of the plurality of clock adjustments.

3. The method of claim 1, wherein the RF metric comprises one or more of:
   a determined bit error rate of the RF channel;
   a determined packet error rate of the RF channel; and
   a determined signal to noise ratio of the RF channel.

4. The method of claim 1, further comprising:
   determining a received signal strength indicator (RSSI) of the RF channel; and
   determining the target clock signal when the RSSI value is above a minimum value threshold.

5. The method of claim 1, further comprising:
   receiving the RF metric from the device over a wired or wireless communication path; and
   communicating the clock adjustment over the wired or wireless communication path.

6. An apparatus for improving reception channel quality comprising:
- a channel monitor component for monitoring a radio frequency channel quality metric (RF metric) of an RF channel used by an RF receiver of a device; and
- a clock control component for determining as a target clock signal a clock signal used by a clocked component of the device to adjust when the RF metric is above or below a threshold and for determining a clock adjustment to apply to the target clock signal, the clock control component determining the target clock signal to adjust by determining one or more possible clock signals that each has a rate having a harmonic within a given range of the center frequency the clock control component selecting, as the target clock signal, the clock signal having a greatest overlap between a frequency band of the clock signal and a frequency band of the RF channel, the clock control component further for returning to monitor the RF metric of the radio frequency channel or an RF metric of another radio frequency channel in use by the device.

7. The apparatus of claim 6, further comprising a clock source component generating the target clock signal adjusted according to the clock adjustment.

8. The apparatus of claim 7, wherein the clock control component determines a plurality of target clock signals to adjust when the RF metric is above or below the threshold, determines a plurality of clock adjustments to apply to respective clock signals of the plurality of target clock signals and controls generation of the plurality of target clock signals by the clock source component according to the respective clock adjustment of the plurality of clock adjustments.

9. The apparatus of claim 6, wherein the RF metric comprises one or more of:
- a determined bit error rate of the RF channel;
- a determined packet error rate of the RF channel: and
- a determined signal to noise ration of the RF channel.

10. The apparatus of claim 6, further comprising:
- the radio frequency (RF) receiver receiving an RF signal on at least the RF channel;
- the component operating at a rate of the clock signal; and
- a clock source providing a base frequency for generating the clock signal for the component of the device.

11. The apparatus of claim 6, further comprising:
- a plurality of RF receivers,
- wherein the channel monitor monitors a respective RF metric associated with a respective RF channel used by each of the RF receivers.

12. The apparatus of claim 6, wherein a base frequency of the clock signal generated by the at least one clock source varies based on one or more environmental conditions.

13. A system comprising:
- an electronic device for improving reception channel quality comprising:
    - a channel monitor component for monitoring a radio frequency channel quality metric (RF metric) of a radio frequency channel used by an RF receiver; and
    - a clock control component for determining as a target clock signal a clock signal used by a clocked component to adjust when the RF metric is above or below a threshold and for determining a clock adjustment to apply to the target clock signal, the clock control component determining the target clock signal to adjust by determining one or more possible clock signals that each has a rate having a harmonic within a given range of the center frequency, the clock control component selecting, as the target clock signal, the clock signal having a greatest overlap between a frequency band of the clock signal and a frequency band of the RF channel, the clock control component further for returning to monitor the RF metric of the radio frequency channel or an RF metric of another radio frequency channel in use by the device; and
- a peripheral device comprising:
    - the clocked component operating at a frequency of the clock signal;
    - the RF receiver;
    - a clock source generating the clock signal;
    - a RF metric component for determining the RF metric associated with the RF receiver and communicating the RF metric to the channel monitor of the electronic device; and
    - a local clock generator for controlling the clock source to generate the clock signal according to the clock adjustment of the target clock determined by the clock control component of the electronic device.

14. A method for improving reception channel quality comprising:
- monitoring a radio frequency channel quality metric (RF metric) of a radio frequency channel in use by a device;
- determining a center frequency of the RF channel;
- determining as a target clock signal a clock signal used by a clocked component of the device to adjust when the RF metric violates a threshold, wherein determining the target clock signal to adjust comprises:
    - determining one or more possible clock signals used by one or more clocked components of the device, each of the possible clock signals having a respective rate that has a harmonic within a given range of the center frequency;
    - determining, for each clock signal of the one or more possible clock signals, an interference value based on a weighted value of a distance between the closest harmonic of the respective clock signal and the center frequency;
    - selecting, as the target clock signal, the clock signal having the interference value indicative of a clock signal most likely to interfere with the RF channel;
- determining a clock adjustment to apply to the target clock signal;
- adjusting a rate of the target clock signal according to the clock adjustment; and
- returning to monitor the RF metric of the radio frequency channel or an RF metric of another radio frequency channel in use by the device.

15. The method of claim 14, wherein the weighting value for each clock signal of the one or more possible clock signals is determined based on one or more of:
- the power of the clock signal;
- a distance between a clock signal path in the device and an antenna for the RF channel; and
- a predetermined radiated power from the clock signal path of the device at the antenna for the RF channel.

16. The method of claim 14, further comprising:
- determining a plurality of target clock signals to adjust when the RF metric violates the threshold;
- determining a plurality of clock adjustments to apply to respective clock signals of the plurality of target clock signals; and
- adjusting the plurality of target clock signals according to the respective clock adjustment of the plurality of clock adjustments.

17. The method of claim 14, wherein the RF metric comprises one or more of:

a determined bit error rate of the RF channel;
a determined packet error rate of the RF channel; and
a determined signal to noise ratio of the RF channel.

18. The method of claim 14, further comprising:
determining a received signal strength indicator (RSSI) of the RF channel; and
determining the target clock signal when the RSSI value is above a minimum value threshold.

19. The method of claim 14, further comprising:
receiving the RF metric from the device over a wired or wireless communication path; and
communicating the clock adjustment over the wired or wireless communication path.

20. An apparatus for improving reception channel quality comprising:
a channel monitor component for monitoring a radio frequency channel quality metric (RF metric) of an RF channel used by an RF receiver of a device; and
a clock control component for determining as a target clock signal a clock signal used by a clocked component of the device to adjust when the RF metric is above or below a threshold and for determining a clock adjustment to apply to the target clock signal, the clock control component determining one or more possible clock signals, each of the possible clock signals operating at a rate that has a harmonic within a given range of a center frequency of the RF channel, the clock control component determining for each clock signal of the one or more possible clock signals an interference value based on a weighted value of a distance between the closest harmonic of the respective clock signal and the center frequency of the RF channel, clock control component selecting as the target clock signal the clock signal having the interference value indicative of a clock signal most likely to interfere with the RF channel, the clock control component further for returning to monitor the RF metric of the radio frequency channel or an RF metric of another radio frequency channel in use by the device.

21. The apparatus of claim 20, further comprising a clock source component generating the target clock signal adjusted according to the clock adjustment.

22. The apparatus of claim 20, wherein the weighting value for each clock signal of the one or more possible clock signals is determined based on one more of:
the power of the clock signal;
a distance between a clock signal path in the device and an antenna for the RF channel; and
a predetermined radiated power from the clock signal path at the antenna for the RF channel.

23. The apparatus of claim 21, wherein the clock control component determines a plurality of target clock signals to adjust when the RF metric is above or below the threshold, determines a plurality of clock adjustments to apply to respective clock signals of the plurality of target clock signals and controls generation of the plurality of target clock signals by the clock source component according to the respective clock adjustment of the plurality of clock adjustments.

24. The apparatus of claim 20, wherein the RF metric comprises one or more of:
a determined bit error rate of the RF channel;
a determined packet error rate of the RF channel; and
a determined signal to noise ration of the RF channel.

25. The apparatus of claim 20, further comprising:
the radio frequency (RF) receiver receiving an RF signal on at least the RF channel;
the component operating at a rate of the clock signal; and
a clock source providing a base frequency for generating the clock signal for the component of the device.

26. The apparatus of claim 20, further comprising:
a plurality of RF receivers,
wherein the channel monitor monitors a respective RF metric associated with a respective RF channel used by each of the RF receivers.

27. The apparatus of claim 20, wherein a base frequency of the clock signal generated by the at least one clock source varies based on one or more environmental conditions.

28. A system comprising:
an electronic device for improving reception channel quality comprising:
a channel monitor component for monitoring a radio frequency channel quality metric (RF metric) of a radio frequency channel used by an RF receiver; and
a clock control component for determining as a target clock signal a clock signal used by a clocked component to adjust when the RF metric is above or below a threshold and for determining a clock adjustment to apply to the target clock signal, the clock control component determining one or more possible clock signals, each of the possible clock signals operating at a rate that has a harmonic within a given range of a center frequency of the RF channel, the clock control component determining for each clock signal of the one or more possible clock signals an interference value based on a weighted value of a distance between the closest harmonic of the respective clock signal and the center frequency of the RF channel, clock control component selecting as the target clock signal the clock signal having the interference value indicative of a clock signal most likely to interfere with the RF channel, the clock control component further for returning to monitor the RF metric of the radio frequency channel or an RF metric of another radio frequency channel in use by the device; and
a peripheral device comprising:
the clocked component operating at a frequency of the clock signal;
the RF receiver;
a clock source generating the clock signal;
a RF metric component for determining the RF metric associated with the RF receiver and communicating the RF metric to the channel monitor of the electronic device; and
a local clock generator for controlling the clock source to generate the clock signal according to the clock adjustment of the target clock determined by the clock control component of the electronic device.

* * * * *

UNITED STATES PATENT AND TRADEMARK OFFICE
CERTIFICATE OF CORRECTION

PATENT NO. : 8,406,722 B2
APPLICATION NO. : 13/036280
DATED : March 26, 2013
INVENTOR(S) : Roy It is certified that error appears in the above-identified patent and that said Letters Patent is hereby corrected as shown below:

On the Title Page, in Item (73), under "Assignee", in Column 1, Line 1, delete "Missisauga," and insert -- Mississauga, --, therefor.

In the Drawings

In Fig. 8, Sheet 8 of 8, delete " 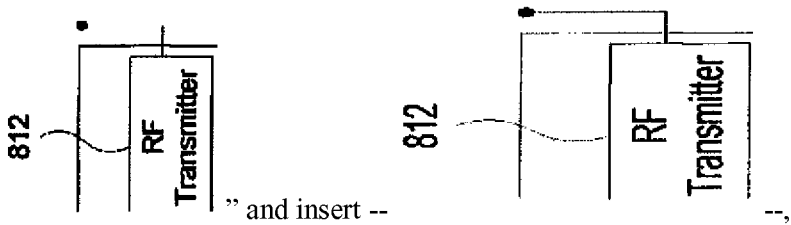 " and insert -- --, therefor.

In the Specification

In Column 13, Line 2, delete "one more" and insert -- one or more --, therefor.

In the Claims

In Column 21, Line 14, in Claim 6, delete "frequency the" and insert -- frequency, the --, therefor.

In Column 21, Line 36, in Claim 9, delete "channel:" and insert -- channel; --, therefor.

In Column 21, Line 37, in Claim 9, delete "noise ration" and insert -- noise ratio --, therefor.

In Column 23, Line 47, in Claim 22, delete "one more" and insert -- one or more --, therefor.

In Column 24, Line 5, in Claim 24, delete "noise ration" and insert -- noise ratio --, therefor.

Signed and Sealed this
Eighteenth Day of February, 2014

Michelle K. Lee
*Deputy Director of the United States Patent and Trademark Office*